Figure 1:
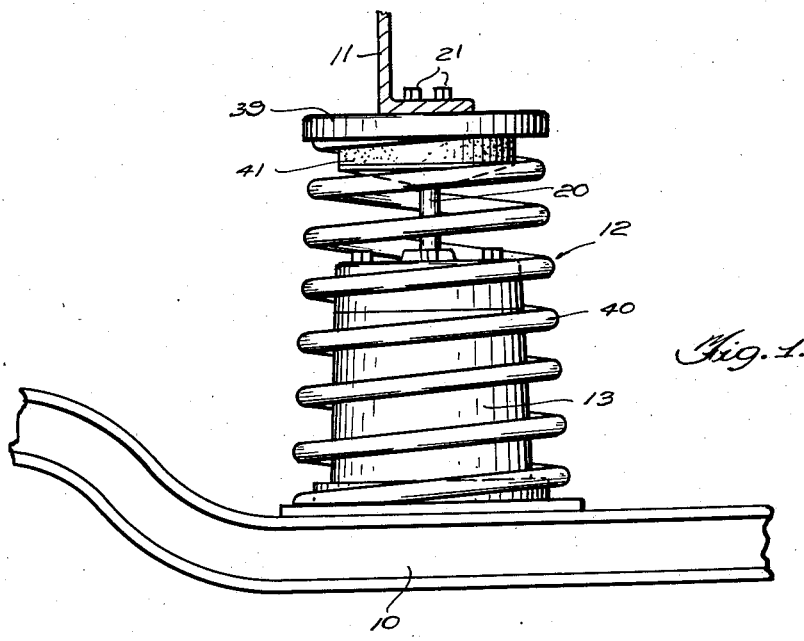

May 18, 1948.　　　　M. HAHN　　　　2,441,629
SHOCK ABSORBER
Filed March 7, 1946　　　　2 Sheets-Sheet 1

Inventor
Malvin Hahn,
By Clarence A. O'Brien
and Harvey B. Jacobson
Attorneys

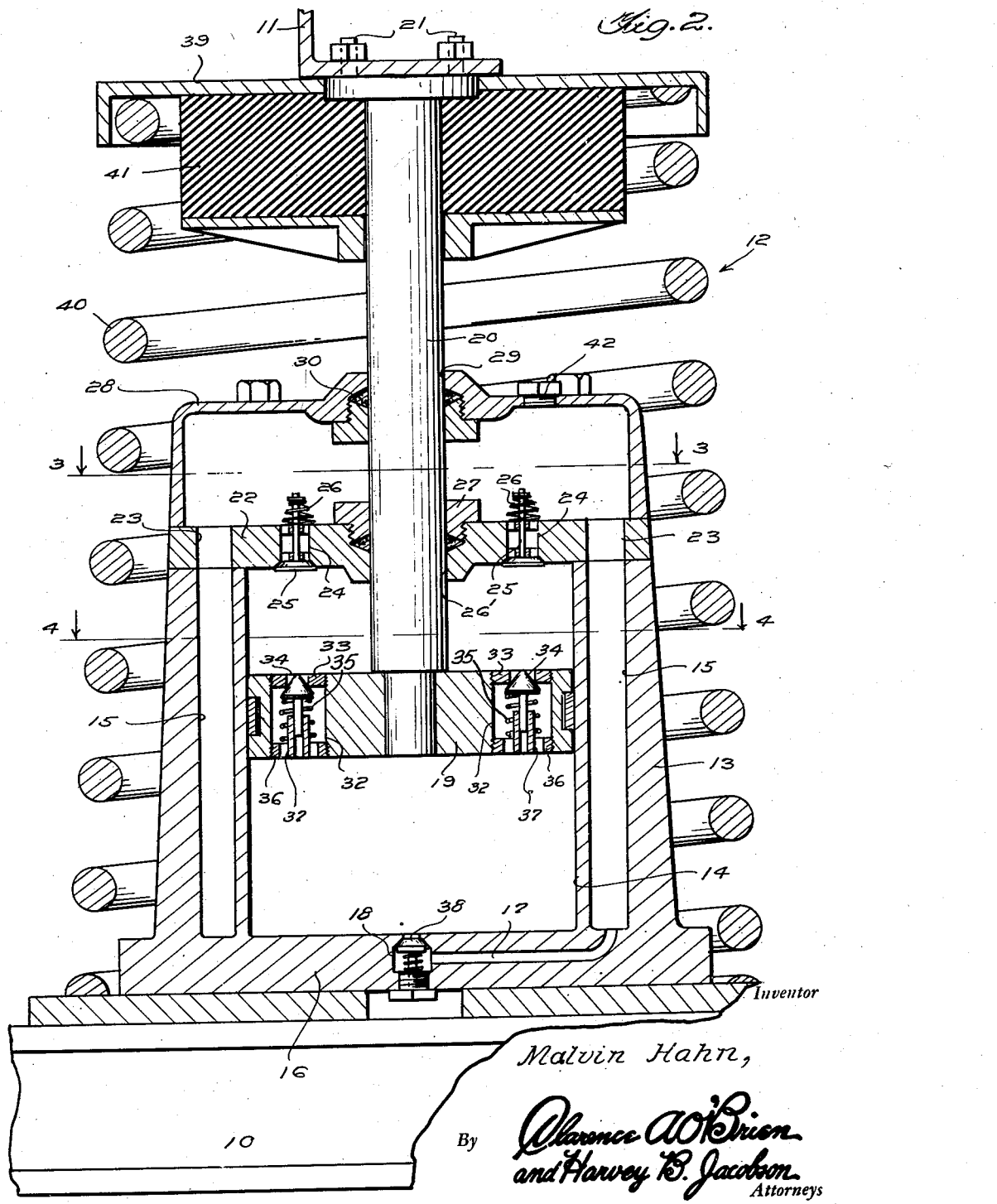

Patented May 18, 1948

2,441,629

UNITED STATES PATENT OFFICE 2,441,629

SHOCK ABSORBER

Malvin Hahn, Lawrenceburg, Ky., assignor of one-half to Forrest E. Hahn, Cincinnati, Ohio Application March 7, 1946, Serial No. 652,736

2 Claims. (Cl. 267—8)

This invention relates to a shock absorber for use between the axle and frame of a vehicle and has for its primary object to control the rebound between the frame and the axle of the vehicle commonly encountered when the vehicle strikes a rough spot in the road.

The above and other objects may be attained by employing this invention which embodies among its features a cylinder adapted to be mounted on the axle of a vehicle, a piston working in said cylinder, a head closing the upper end of the cylinder and forming a partition wall between a super-imposed fluid reservoir and the cylinder, a piston rod connected with the piston and movable axially through the head and the cover, a spring surrounding the cylinder and piston rod and yieldingly engaging the axle and frame of the vehicle to hold the parts in spaced relation, valves in the head for establishing communication between the reservoir and the cylinder when the piston moves downwardly therein, valves in the piston for establishing communication between the upper and lower ends of the cylinder as the piston moves upwardly therein, and means establishing communication between the lower end of the cylinder and the reservoir.

Other features include a valve in the passage which establishes communication between the bottom of the cylinder and the reservoir operable to open said passage when the piston moves downwardly.

Figures 3, 4:
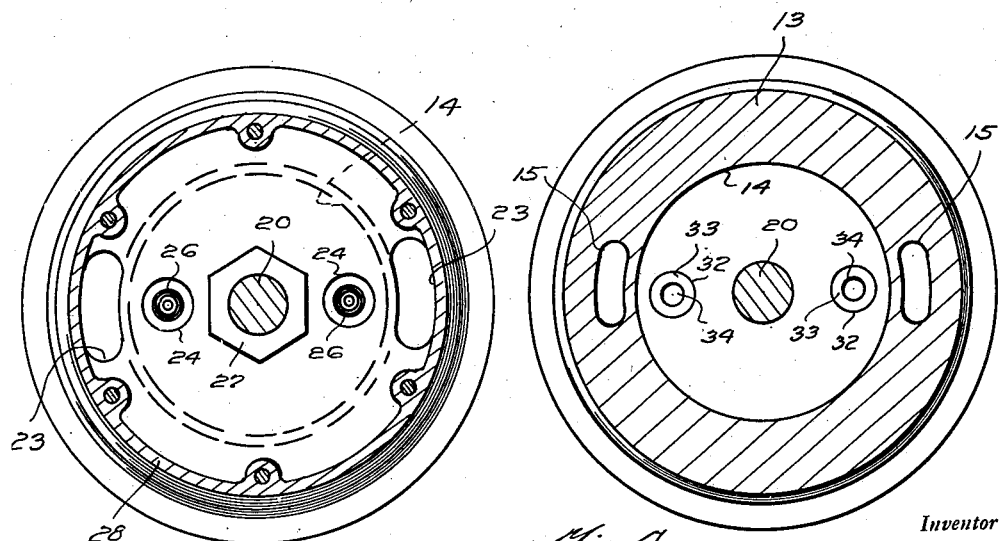

In the drawings:

Figure 1 is a side view of a shock absorber embodying the features of this invention showing the same in position between an axle and a side bar of the chassis of the vehicle, Figure 2 is an enlarged longitudinal sectional view through the shock absorber, Figure 3 is a horizontal sectional view taken substantially along the line 3—3 of Figure 2, and Figure 4 is a horizontal sectional view taken substantially along the line 4—4 of Figure 2.

Referring to the drawings in detail the axle 10 of a conventional vehicle is arranged to support the frame 11 in spaced relation therewith in the conventional manner so as to permit relative movment between the two when a rough spot is encountered in the roadway over which the vehicle may be travelling. Supported on the axle 10 is my improved shock absorber designated generally 12 which comprises a cylinder 13 having an axial bore 14 upon opposite sides of which are arranged longitudinally extending by-pass passages 15 which are coextensive with the cylinder. The upper ends of the bore 14 and the by-pass passages 15 are wholly open. Extending radially through the bottom end 16 of the cylinder are passages 17 which communicate with the by-pass passages 15, and with an opening 18 formed axially in the bottom wall 16.

Mounted for reciprocal motion in the bore 14 of the cylinder 13 is a piston 19 to which a piston rod 20 is attached and this piston rod rises axially through the cylinder, to have its upper end attached as by bolts 21 to the frame 11 of the vehicle. It will thus be seen that when there is relative movement between the axle 10 and the frame 11 the piston 19 will be reciprocated within the bore 14 of the cylinder 13.

Closing the open upper end of the cylinder bore 14 is a head 22 provided with passages 23 which align with the by-pass passages 15 as will be readily understood upon reference to Figure 2. Formed at suitably spaced points in the head 22 are openings 24 for the reception of check valves 25 normally held in closed position by compression springs 26. These valves 25 are so arranged as to open when the piston 19 moves downwardly in the cylinder, and their purpose will more fully hereinafter appear. The head 22 is provided with an axial opening 26' for the reception of the piston rod 20 and a suitable packing gland 27 is arranged to surround the piston rod in order to form a fluid tight joint between the rod and head.

A hollow cylindrical cover 28 is mounted atop the head 22 and forms a fluid storage reservoir which communicates with the passages 15 through the openings 23 in the head 22. Like the head 22 the end wall of the cover 28 is formed with an axial opening 29 through which the piston rod 20 extends and surrounding the piston rod is a packing gland 30 which serves to prevent the escape of fluid from the interior of the fluid reservoir around the piston rod.

Formed at spaced intervals in the piston 19 are passages or ports 32 carrying at their upper ends valve seats 33 for engagement with check valves 34 which are normally held in closed position by compression springs 35. As shown the upper ends of the springs 35 bear against the undersides of the valves 34 while the lower ends of the springs 35 rest on collars 36 which are entered into the lower ends of the ports 32 and are provided with relatively small passages 37 which serve to retard the flow of fluid from one side of the piston to the other, and hence retard the elevation of the piston within the cylinder. A check valve 38 is mounted in the axial bore 18 and operates in such a manner that when the piston 19 descends in the cylinder, the fluid on the underside of the piston will be forced out through the radial passages and upward through the by-pass passages 15 into the reservoir formed by the cap 28.

Carried by the upper end of the piston rod is an inverted cup 39 which forms the bearing for the upper end of a compression coil spring 40 which encircles the piston and piston rod so as to urge the axle 10 and frame 11 away from one another. A suitable rubber cushion 41 surrounds the upper end of the piston rod near its junction with the frame 11 and serves as a buffer.

In operation it will be understood that when a rough spot is encountered in the roadway over which the vehicle may be travelling the axle 10 will be driven upwardly toward the frame 11, thus causing the cylinder 13 to rise against the piston 19. Fluid having been introduced into the reservoir through the medium of the opening 42 in the cover 28 will cause the check valves 25 to open against the compression of the springs 26 as to permit the fluid to flow through the ports 24 and into the upper end of the bore 14 above the piston 19. Any fluid which may be contained in the space between the bottom 16 of the cylinder 13 and the piston 19 will be forced outwardly through the check valve 38, the radial passages 17, the by-pass passages 15 and the openings 23 in the head 22, into the reservoir formed by the cap member 28. It will thus be seen that the telescopic motion between the cylinder and the piston will refill the reservoir so as to maintain an adequate supply of fluid on the upper side of the head 22. Naturally the movement of the axle 10 toward the frame member 11 will compress the spring 40 and while under such compression this spring will endeavor to force the parts away from one another, and thereby exert pull on the piston rod to cause the piston to rise in the cylinder against the fluid that has been drawn into the cylinder through the check valves 25. The return of the parts to their initial position is effected through the automatic opening of the check valves 34 and the escape of the fluid from the upper side of the piston to the lower side thereof through the passages 37. Obviously by regulating the size of these passages, as by substituting bushings 36 having different sized openings 37 therein, the speed with which the parts return to their initial positions may be regulated. It will be understood of course that the shock absorber is to be installed on the vehicle after the speed of rebound of the spring system has been determined, so that the proper bushing 36 may be selected in accordance with the spring reaction.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A shock absorber comprising a vertically disposed cylinder adapted to be attached ot the axle of a vehicle, a piston operable in the cylinder, a head closing the upper end of the cylinder, a piston rod connected to the piston and extending axially through the head, the upper end of the rod being adapted to be attached to the frame of the vehicle, a spring encircling the cylinder and rod and engaging the axle and frame yielding to hold the axle and frame in spaced relation, a hollow cap supported on the head having an axial opening through which the piston rod works, said cap cooperating with the head in forming a fluid reservoir at the upper end of the cylinder, check valves in the head establishing communication between the reservoir and cylinder when the piston is moved against the force of the spring, check valves in the piston establishing communication through the piston when it is moved in the opposite direction and means establishing communication between the lower end of the cylinder and the reservoir when the piston is moved against the spring.

2. A shock absorber comprising a vertically disposed cylinder adapted to be attached to the axle of a vehicle, a piston operable in the cylinder, a head closing the upper end of the cylinder, a piston rod connected to the piston and extending axially through the head, the upper end of the rod being adapted to be attached to the frame of the vehicle, a spring encircling the cylinder and rod and engaging the axle and frame yielding to hold the axle and frame in spaced relation, a hollow cap supported on the head having an axial opening through which the piston rod works, said cap cooperating with the head in forming a fluid reservoir at the upper end of the cylinder, check valves in the head establishing communication between the reservoir and cylinder when the piston is moved against the force of the spring, check valves in the piston establishing communication through the piston when it is moved in the opposite direction, the wall of the cylinder and the head having by-pass passages therein establishing communication between the lower end of the cylinder and the reservoir and a check valve operable to open said by-pass passages when the piston is moved against the force of the spring.

MALVIN HAHN.

REFERENCES CITED

The following references are of record in the file of this patent:

UNITED STATES PATENTS

| Number | Name | Date |
|---|---|---|
| 439,302 | Minton | Oct. 28, 1890 |
| 1,078,060 | Newman | Nov. 11, 1913 |
| 1,992,526 | Funston | Feb. 26, 1935 |

FOREIGN PATENTS

| Number | Country | Date |
|---|---|---|
| 422,656 | Great Britain | Jan. 16, 1935 |
| 824,382 | France | Nov. 10, 1937 |